United States Patent
Brumme et al.

(10) Patent No.: US 7,152,223 B1
(45) Date of Patent: Dec. 19, 2006

(54) METHODS AND SYSTEMS FOR COMPILING AND INTERPRETING ONE OR MORE ASSOCIATIONS BETWEEN DECLARATIONS AND IMPLEMENTATIONS IN A LANGUAGE NEUTRAL FASHION

(75) Inventors: Christopher W. Brumme, Mercer Island, WA (US); James H. Hogg, Bellevue, WA (US); Craig T. Sinclair, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 948 days.

(21) Appl. No.: 09/873,700

(22) Filed: Jun. 4, 2001

(51) Int. Cl.
G06F 9/44 (2006.01)
G06F 9/45 (2006.01)

(52) U.S. Cl. ............... 717/116; 717/146; 717/148; 717/152; 717/162; 717/165

(58) Field of Classification Search ............ 717/162, 717/146, 151, 104, 153, 116; 715/501.1; 707/100; 709/332; 719/315, 316
See application file for complete search history.

(56) References Cited

U.S. PATENT DOCUMENTS

| | | | |
|---|---|---|---|
| 5,689,709 A * | 11/1997 | Corbett et al. ............ 719/315 |
| 5,842,018 A * | 11/1998 | Atkinson et al. ......... 715/501.1 |
| 5,907,707 A * | 5/1999 | Ramalingam et al. ...... 717/104 |
| 5,911,076 A | 6/1999 | Acker et al. .............. 395/707 |
| 5,960,197 A * | 9/1999 | Segnan ..................... 717/116 |
| 6,141,792 A | 10/2000 | Acker et al. ............... 717/5 |
| 6,182,281 B1 | 1/2001 | Nackman et al. ........... 717/5 |
| 6,182,283 B1 * | 1/2001 | Thomson ................... 717/153 |
| 6,381,734 B1 * | 4/2002 | Golde et al. .............. 717/165 |
| 6,412,020 B1 * | 6/2002 | Leach et al. .............. 719/316 |
| 6,560,774 B1 * | 5/2003 | Gordon et al. ............. 717/146 |
| 6,651,248 B1 * | 11/2003 | Alpern .................... 717/162 |
| 6,658,421 B1 * | 12/2003 | Seshadri .................. 707/100 |
| 6,704,927 B1 * | 3/2004 | Bak et al. ................ 717/151 |
| 2003/0028686 A1 * | 2/2003 | Schwabe et al. ........... 709/332 |

OTHER PUBLICATIONS

Freund, S., et al., "A Type Systems for Object Initialization in the Java Bytecode Language", *ACM Transactions on Programming Languages & Systems*, vol. 21, No. 6, Nov. 1, 1999. p. 1196-1250.
Walker, D., et al., "Typed Memory Management via Static Capabilities", *ACM Transactions on Programming Languages & Systems*, vol. 22, No. 4, Jul. 1, 2000, p. 701-771.

* cited by examiner

*Primary Examiner*—Kakali Chaki
*Assistant Examiner*—Insun Kang
(74) *Attorney, Agent, or Firm*—Amin, Turocy, & Calvin, LLP

(57) ABSTRACT

Methods and systems are provided for expressing one or more associations between source language declarations and implementations in a language neutral fashion. A determination is made as to whether a source language association rule related to a declaration is different from a default association rule for a target runtime. If so, an override association is expressed between the declaration and the implementation, and if not, a default association is expressed. Methods and systems are also provided for interpreting an association between a declaration and an implementation in a runtime system, wherein a determination is made as to whether the association comprises an override association. If so, the association is interpreted according to an override association rule for the runtime system, and if not, the association is interpreted according to a default association rule.

21 Claims, 11 Drawing Sheets

METHODS AND SYSTEMS FOR COMPILING AND INTERPRETING ONE OR MORE ASSOCIATIONS BETWEEN DECLARATIONS AND IMPLEMENTATIONS IN A LANGUAGE NEUTRAL FASHION

TECHNICAL FIELD

The present invention relates generally to computer systems, and more particularly to improved methods and systems for expressing and interpreting associations between declarations and implementations in computer systems.

BACKGROUND

Software programs are commonly written in a high-level programming language, such as VISUAL BASIC, C++, COBOL, Pascal, Smalltalk, or the like. The high-level language statements or instructions of the program (e.g., source code) are then translated or compiled into coded instructions (e.g., native or object code), which are executable by the computer. Typically, a software program known as a compiler is used for this translation. Processes for compiling source code into executable object or native code are well known in the art. The compiler initially performs lexical analysis on the source code to separate the source code into various lexical structures of the programming language (generally known as tokens), such as keywords, identifiers, operator symbols, punctuation, and the like. Syntactical analysis is then performed in which the compiler groups the tokens into various syntax structures of the programming language, such as expressions, declaration statements, loop statements, procedure calls, and the like. Thereafter, the compiler generates and optimizes code for each of these structures.

Such source code program representations may include declarations and implementations which the compiler must associate. For instance, a source program may include a function or method declaration in an interface being implemented by a class. The class implementing the interface may in turn provide an implementation for the declared function or method. The compiler associates the declaration and the implementation in generating native code for the program. Compilers typically employ one or more association rules particular to the source code language of interest in associating such source code declarations and implementations.

Where the programmer writes source code which is vague or ambiguous as to what implementation is to be associated with a particular declaration, the compiler typically generates a compiler error, which the programmer must address before the program can be successfully compiled. In this case, the compiler employs one or more association or disambiguation rules (e.g., signature matching, calling context, etc.), or criteria in determining when to generate such an error. Such association or disambiguation rules are generally specific to a particular source code language, as the syntax and semantics of source code languages varies greatly. Thus, the association rules appropriate for one source code language may not be (e.g., and typically are not) adaptable to properly associated declarations and implementations in another source code language.

Recent developments in programming technologies have provided common language runtime systems, in which programs and software modules created in a variety of source code programming languages may be executed, and/ or combined to form new programs. The programmer compiles source code (e.g., written in a high-level programming language) into an intermediate language representation of the source code (e.g., intermediate language or "IL" code) using a source compiler. In this case, the source compiler does not generate native (e.g., machine executable) code, but instead provides only the IL representation. The runtime system then receives the IL code representation from the source compiler, and performs an IL to native code conversion, which may be accomplished using a just-in-time (JIT) compiler. This IL to native code conversion (e.g., JIT compilation) may include combining software components (e.g., modules, objects, etc.) from a variety of sources, which may have been originally coded in different high-level (e.g., source code) languages.

Although the IL representation defines the declarations and implementations, the IL code does not define the associations therebetween. The combination of such software components in the runtime system thus includes associating declarations with implementations. Before JIT compilation, all such associations must be understood by the runtime in order to generate the correct native implementation. This is because ambiguities in the association between a declaration and an implementation may not be easily addressable at the point in time when the JIT compilation occurs. For instance, name collisions in declarations and implementations may not be correctable in the source code, since the runtime system receives only the IL program representation from the source compiler(s). The point where JIT compilation occurrs may be too late to provide the original programmer with a compiler error. Thus, previous source language compilers disambiguate declarations according to their rules, and the newer common language runtime systems must make the same associations. In addition, the common language runtime needs to understand the cross language differences. Furthermore, the runtime system may be able to implement a number of disambiguation or association rules, but cannot support all such association rules for all source languages.

Thus, even where a common language runtime system employs one or more such default association rules (e.g., signature matching, name matching, etc.), the runtime system cannot reliably associate every declaration/implementation pair. Moreover, such ambiguities may result from the combination of such IL code components, which were originally generated by different programmers in different source code languages. In this case, the source compilers may not even be able to detect such ambiguities. Thus, improved methods and systems are needed to reduce the possibility of ambiguities in association between declarations and implementations in such common language runtime systems.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The invention comprises methods and systems for expressing one or more associations between source language declarations and implementations in a language neutral fashion. The invention may be employed in a source language compiler generating an intermediate language (IL) representation of a source language program, wherein the IL code is provided with explicit or override associations where the runtime system may not otherwise be able to disambiguate a particular association using its default association rules. The invention provides for a reduction or elimination in ambiguities in common language runtime systems, for example, whereby a class may implement two or more inherited methods having matching names and signatures. The invention further provides methods and systems for interpreting associations between a declaration and an implementation in a runtime system.

The invention thus allows generation of intermediate language representations of source language computer programs, wherein associations between declarations and implementations are expressed in an unambiguous, language neutral fashion. At runtime, a common language runtime system may accordingly interpret the expressed associations in generating and running native code, without encountering ambiguous associations. The runtime system may thereby employ intermediate language representations of software components for binding just prior to execution therein, where potential ambiguities in associating a declaration with an implementation have been previously dealt with by the source compiler via employment of an override association.

According to one aspect of the invention, a determination is made as to whether a source language association rule related to a declaration is different from a default association rule for a target runtime system. For example, the target runtime system may receive intermediate language program representations from one or more source compilers, and may comprise a default association rule for associating declarations and implementations by signature matching. If so, an association expression system in a source compiler may express an override association between the declaration and the implementation where the source language association rule does not comprise signature matching.

The association may thus be expressed where the signatures of the declaration and the appropriate implementation do not match, or where the declaration signature matches two or more implementation signatures. The compiler may accordingly disambiguate two different implementations (e.g., in a class implementing two virtual functions having the same signature), and provide an expression of an association between a declaration (e.g., a declaration in an interface being implemented by the class) and the selected implementation in an unambiguous, language neutral fashion. Thus, where a source language association rule not supported by a target runtime system may create ambiguity, the compiler may express an override association between a declaration and an implementation. The invention thereby provides for language neutral override association expression, which may be selectively employed by a source compiler to prevent ambiguous or undesired associations at runtime. The invention further contemplates expressing such associations using an override association for each declaration and implementation.

According to another aspect of the invention, methods and systems are provided for interpreting an association between a declaration and an implementation in a target runtime system. A determination may be made as to whether the association comprises an override association. If so, the association may be interpreted according to an override association rule for the target runtime system, and if not, the association is interpreted according to a default association rule. Yet another aspect of the invention provides for interpreting the association between the declaration and the implementation according to an override association rule for the target runtime in all cases.

Other aspects of the invention provide for computer-readable media having computer-executable instructions for expressing an association between a declaration and an implementation in a language neutral fashion. In addition, the invention comprises computer-readable media having computer-executable instructions for interpreting such expressed associations in a runtime environment or system.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION

Figure 1:
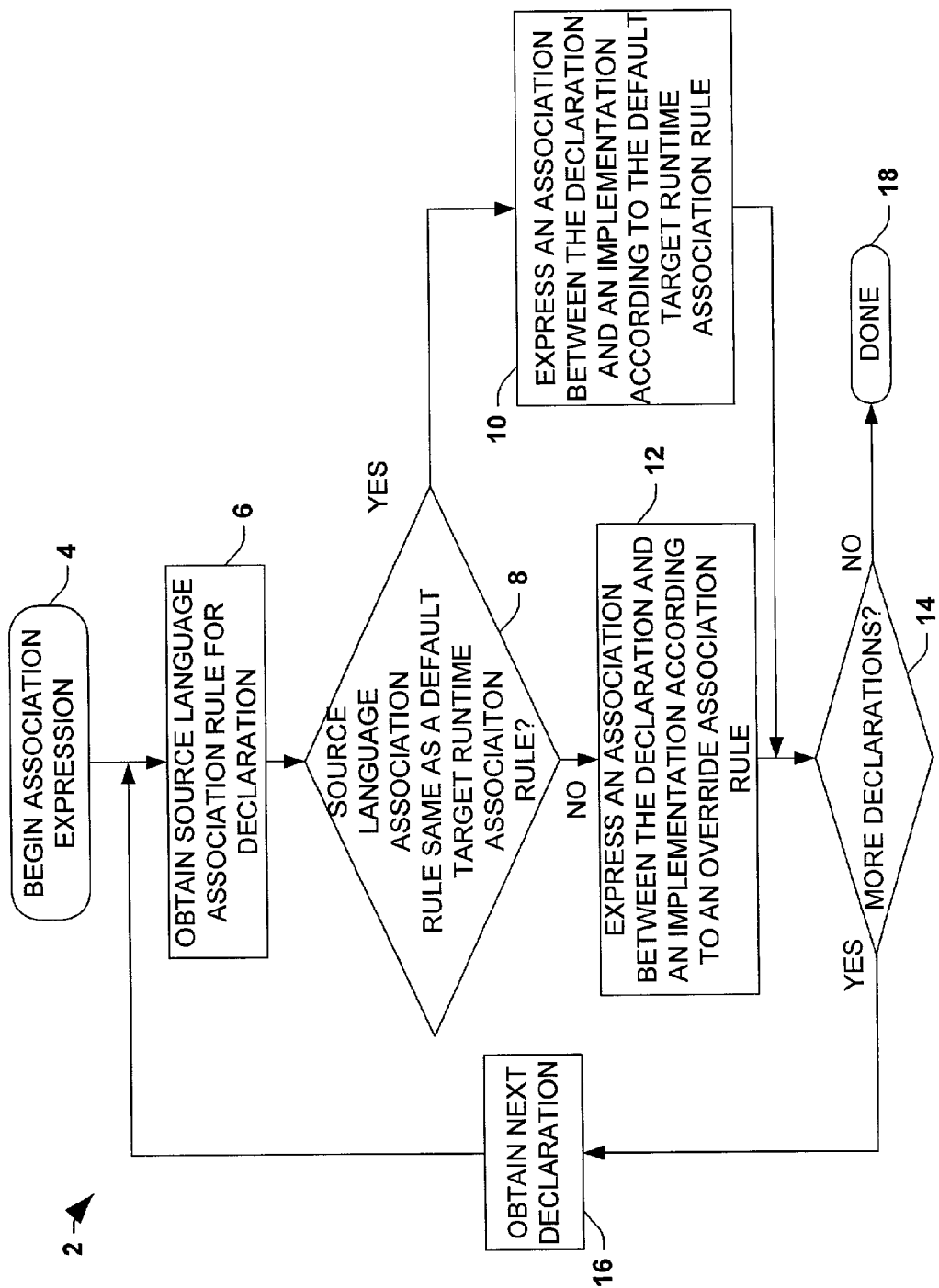
FIG. 1 is a flow diagram illustrating an exemplary method of expressing an association between a declaration and an implementation in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. Moreover, well-known structures and devices are illustrated in some instances in block diagram form in order to facilitate description of the present invention. The present invention comprises methods and systems for expressing associations between declarations and implementations in a language neutral fashion, which may be advantageously employed in association with (e.g., or as part of) source compilers in generating IL code for a common language runtime system. In addition, the invention provides methods and systems for interpreting associations in a common language runtime system. The invention thereby provides for unambiguous runtime association of declarations and implementations in a common language runtime environment.

Referring now to the drawings, FIG. 1 illustrates an exemplary method 2 of expressing an association between a declaration and an implementation according to one aspect of the invention. While the exemplary method 2 is illustrated and described herein as a series of acts or events, it will be appreciated that the present invention is not limited by the illustrated ordering of acts, as some acts may occur in different orders and/or concurrently with other acts apart from that shown and described herein, in accordance with the invention. In addition, not all illustrated acts may be required to implement a methodology in accordance with the present invention. The method 2 may find utility in association with source compilers and other systems illustrated and described in greater detail herein. However, it will be appreciated that the exemplary method 2, as well as other methodologies according to the invention, may be implemented in association with the apparatus and systems illustrated and described herein as well as in association with other systems not illustrated.

The method 2 may be employed in a source compiler, in order to express an association between a source code declaration and an implementation in a language neutral manner. One particular aspect of the invention provides for determining whether a source language association rule related to a declaration is different from a default association rule for a target runtime, and expressing an association according to an override association rule or a default association rule for a target runtime, depending on the determination. For example, the association may be expressed according to the override rule if the source language association rule is different from the default association rule for the target runtime.

Beginning at 4, a source language association rule is obtained at 6 for a declaration in a source code program or module. The declaration may include a reference such as a call to a function or method, for which an implementation is needed. For example, an interface in the source code may declare a method, and a class implementing the interface may include an implementation of the method, such as a portion or body of code. The source language association rule may include criteria or other considerations which may be used to determine an appropriate or desired implementation to associate with the declaration. For example, the source language association rule may include name matching, signature matching, and/or may take into account other considerations such as calling context.

A declaration may include a signature which matches the signature of a single implementation, more than one implementation, or which doesn't match with any implementation signatures. Where the declaration signature matches more than one implementation signature, the source language association rule may disambiguate according to the calling context of the declaration and implementations. In addition, the source language association rule may take into account whether the method is a virtual or a non-virtual (e.g., instance) method, in order to determine the intended or desired implementation to associate with a declaration. A target runtime system or environment, on the other hand, may employ different default association rules. For example, a target common language runtime system may only employ signature or name matching to associate declarations and implementations.

At 8, the source language association rule for the declaration of interest is compared with the target runtime association rule, and a determination is made as to whether the source language association rule is the same as a default target runtime association rule. If so, an association between the declaration and the implementation is expressed at 10 according to the default association rule for the target runtime system. For example, where both rules employ signature matching only, the association is expressed at 10 using signature matching. Otherwise, an override association is expressed at 12 according to an override association rule. Thereafter a determination is made at 14 as to whether associations need to be expressed for more declarations. If so, the next such declaration is obtained at 16, and the method 2 proceeds to 6 as described above. When all associations have been expressed, the method 2 ends at 18.

The override association rule at 12 may comprise expressing an explicit association between the declaration and the implementation. For example, an association may be created between a class, a code body associated with the implementation, and the declaration through the provision of an entry in an override association table having fields for the class, the code body, and the declaration. Thus, in the above example, the declaration may comprise a method declaration signature, the implementation may comprise an implementation signature in a class, and the default association rule for the target runtime may comprise signature matching. A compiler generating IL code destined for use in the target runtime may determine that a particular declaration signature matches more than one implementation signature, and accordingly express an override association between the declaration and an appropriate implementation according to an override association rule.

Such an override association may also be expressed where the declaration signature does not match the implementation signature. In either case, the employment of an override association expression provides the runtime with an explicit (e.g., unambiguous) indication of the appropriate implementation for the declaration. For example, the invention allows a class to implement two or more inherited (e.g., virtual) methods, having matching names and signatures. The exemplary method 2 provides for an unambiguous association between the declaration and the appropriate implementation, expressed in a language neutral fashion, whereby the runtime is provided with an override association expression in cases where the runtime default association rule(s) may not otherwise be able to determine the proper association.

Thus, in accordance with the invention, where a method declaration signature matches first and second implementation signatures in a class, expressing an association between the declaration and an implementation according to an override association rule may comprise expressing an explicit association between the method declaration signature and one of the first and second implementation signatures. In this regard, the selection of the appropriate implementation to associate with the declaration may be accomplished according to a source language association rule.

Figure 2:
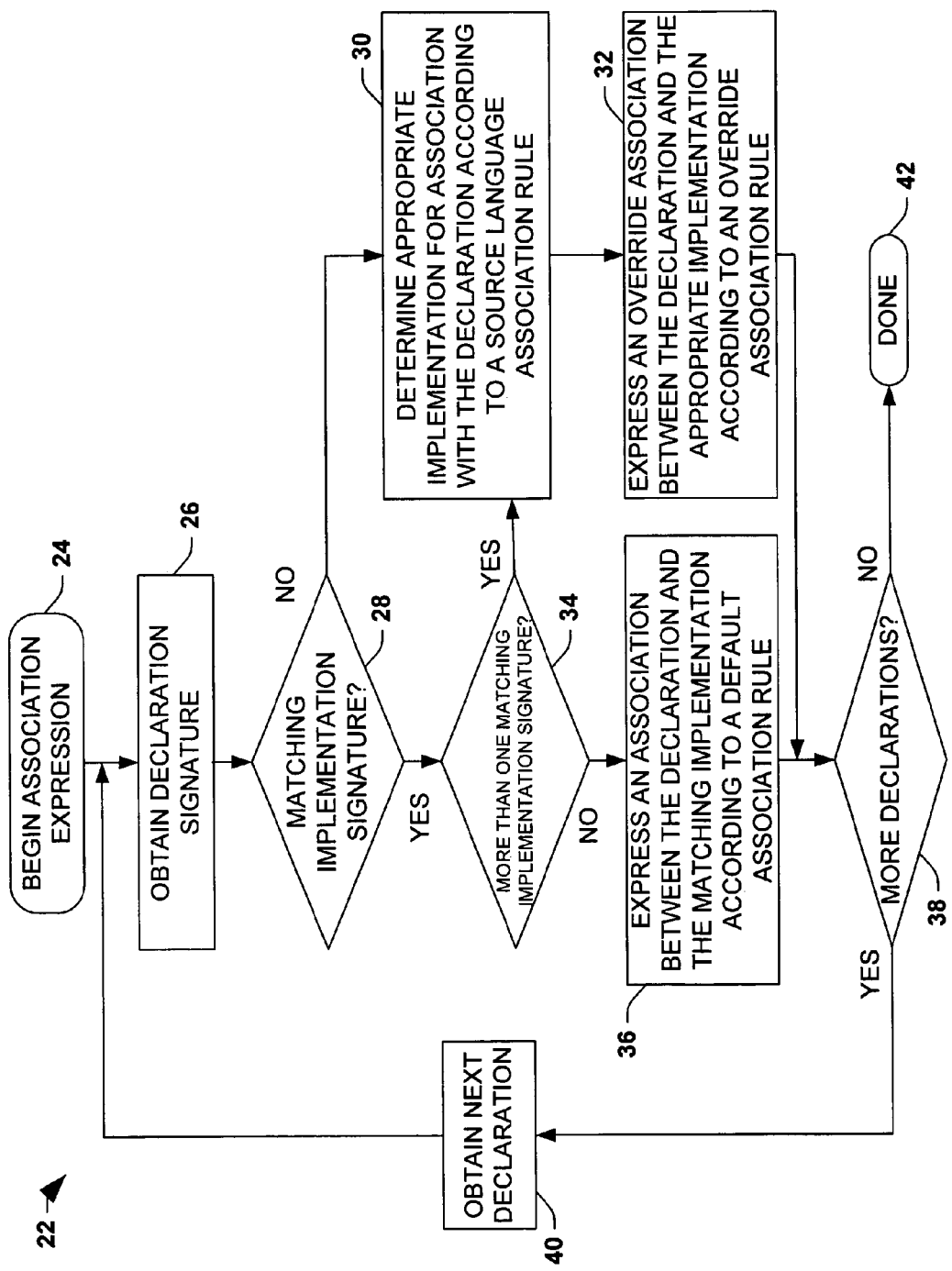
FIG. 2 is a flow diagram illustrating another exemplary method of expressing an association between a declaration and an implementation.

Referring now to FIG. 2, another exemplary method 22 of expressing an association between a declaration and an implementation in a language neutral fashion is illustrated beginning at 24. While the exemplary method 22 is illustrated and described herein as a series of acts or events, it will be appreciated that the present invention is not limited by the illustrated ordering of acts, as some acts may occur in different orders and/or concurrently with other acts apart from that shown and described herein, in accordance with the invention. In addition, not all illustrated acts may be required to implement a methodology in accordance with the present invention. The method 22 may be employed in association with source compilers and other systems illustrated and described in greater detail herein. However, it will be appreciated that the exemplary method 22, as well as other methodologies according to the invention, may be implemented in association with the apparatus and systems illustrated and described herein as well as in association with other systems not illustrated.

The method 22 may be employed, for example, in a source compiler generating IL code for a runtime having a default association rule which employs signature matching. In this regard, the signature of a declaration and/or an implementation may comprise, for example, a method name, a return type, and one or more parameters. It will be further appreciated that the methodologies of the invention may be employed in association with default runtime association rules involving name matching or other default association rules. In accordance with the method 22, a declaration signature is obtained at 26, and a determination is made at 28 as to whether a matching implementation signature exists. If not, an appropriate implementation for association with the declaration is determined at 30 according to one or more source language association rules.

For example, calling context or other criteria may be employed in order to identify the appropriate implementation to associate with the declaration. Thereafter at 32, an override association is expressed between the declaration and the appropriate implementation according to an override association rule. It will be noted that the exemplary method provides for selection of the appropriate implementation using one or more source language association rules, and provides an explicit or override association expression, such that a target runtime (e.g., which may not implement the specific source language association rules) will correctly associate the declaration with the appropriate implementation at runtime. For example, at 30 and 32, signature matching alone (e.g., in a target runtime system) would not yield a correct association (e.g., no association will be made, since no signature match).

The method 22 further addresses the situation in which signatures of more than one implementation match the declaration signature, which cannot be disambiguated according to precedence rules set out by the writer. Where a matching implementation signature exists at 28, a determination is made at 34 as to whether more than one such matching implementation signatures exist. If so, the method 22 proceeds through 30 and 32 as described above, whereby an appropriate implementation is selected at 30 according to one or more source language association rules, and an override association is expressed at 32. Where only one matching implementation signature exists at 34, a default association is expressed between the declaration and the matching implementation according to a default association rule at 36. After an association is expressed at either 32 (e.g., override association) or 36 (e.g., default association), a determination is made at 38 as to whether more declarations exist for which associations need to be expressed. If so, the next such declaration is obtained at 40, and the method 22 returns to 26 as described above. Otherwise, the method 22 ends at 42.

Another aspect of the invention provides a system for expressing an association between a declaration and an implementation in a language neutral fashion. The system may comprise a first component, which determines whether a source language association rule related to the declaration is different from a default association rule for a target runtime, as well as an association expression component. The association expression component expresses either an override or a default association based on whether the source language association rule is different from the default runtime association rule, or whether the rules are the same, respectively. The association expression component may express an override association by creating an association between a class, a code body associated with the implementation, and the declaration, which may comprise an entry in an override association table.

Figure 3:
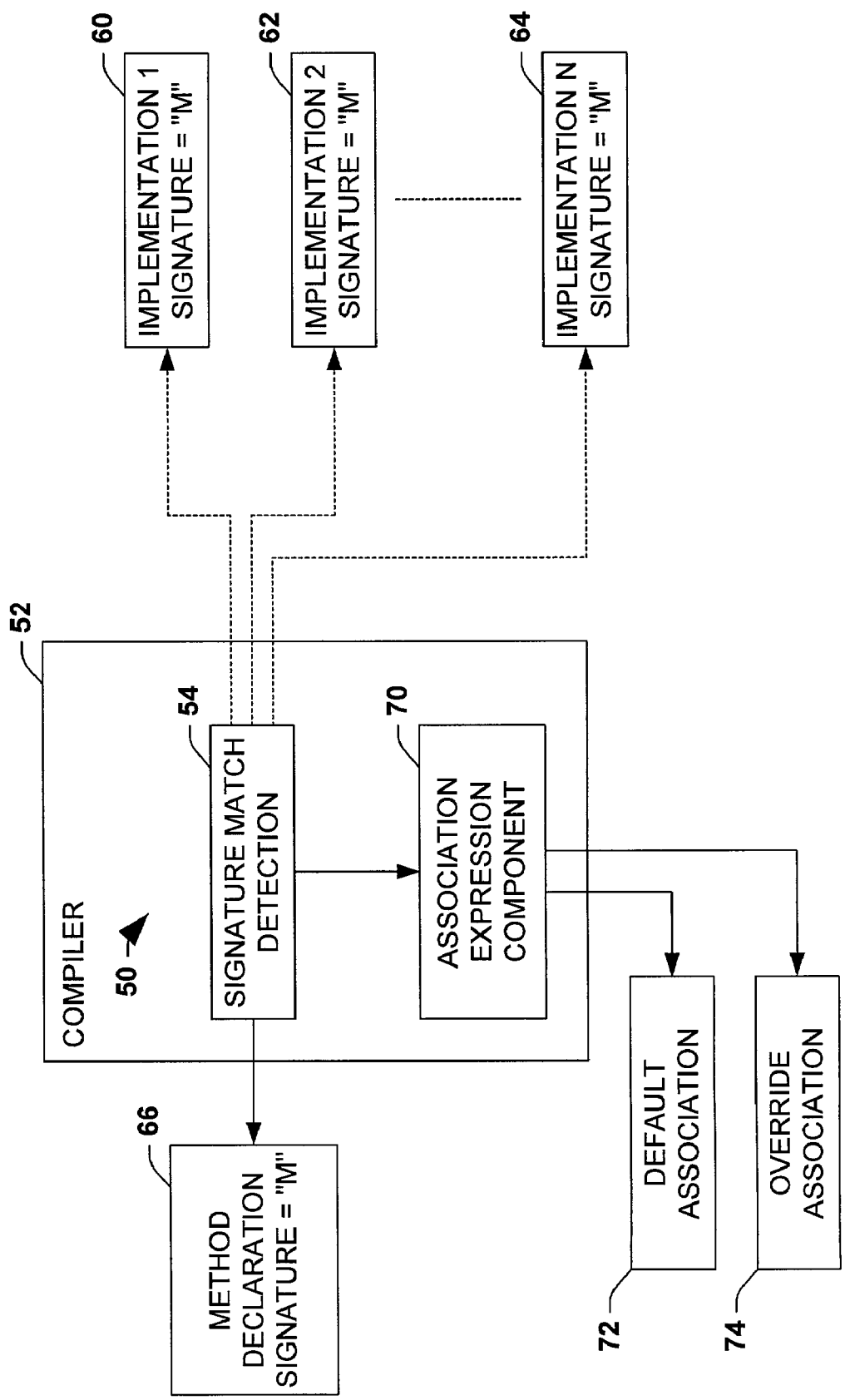
FIG. 3 is a schematic diagram illustrating an exemplary system for expressing an association between a declaration and an implementation according to another aspect of the invention.

An exemplary system 50 for expressing an association between a declaration and an implementation is illustrated in FIG. 3. The system 50 may be employed in a source compiler 52 for generating IL code representing a source language program, for use in a common language runtime system (not shown). For instance, the target runtime system may employ an association rule which includes signature matching. The system 50 may include a first component 54 to determine whether an implementation signature associated with one or more source language implementations 60, 62, and/or 64 match a declaration signature of a source language method declaration 66.

Based on the determination, an association expression component 70 in the system 50 may express a default association 72 or an override association 74 between the declaration 66 and an appropriate one of the implementations 60, 62, or 64. The expression component 70 may determine the appropriate implementation 60, 62, or 64 to associate with the declaration 66 according to one or more association rules specific to the source language, and provide an override association expression when a target runtime may not be able to make the correct or desired association (e.g., due to ambiguity where multiple implementation signatures match the declaration signature, or vagueness where no implementation signatures match the declaration signature).

Figure 4:
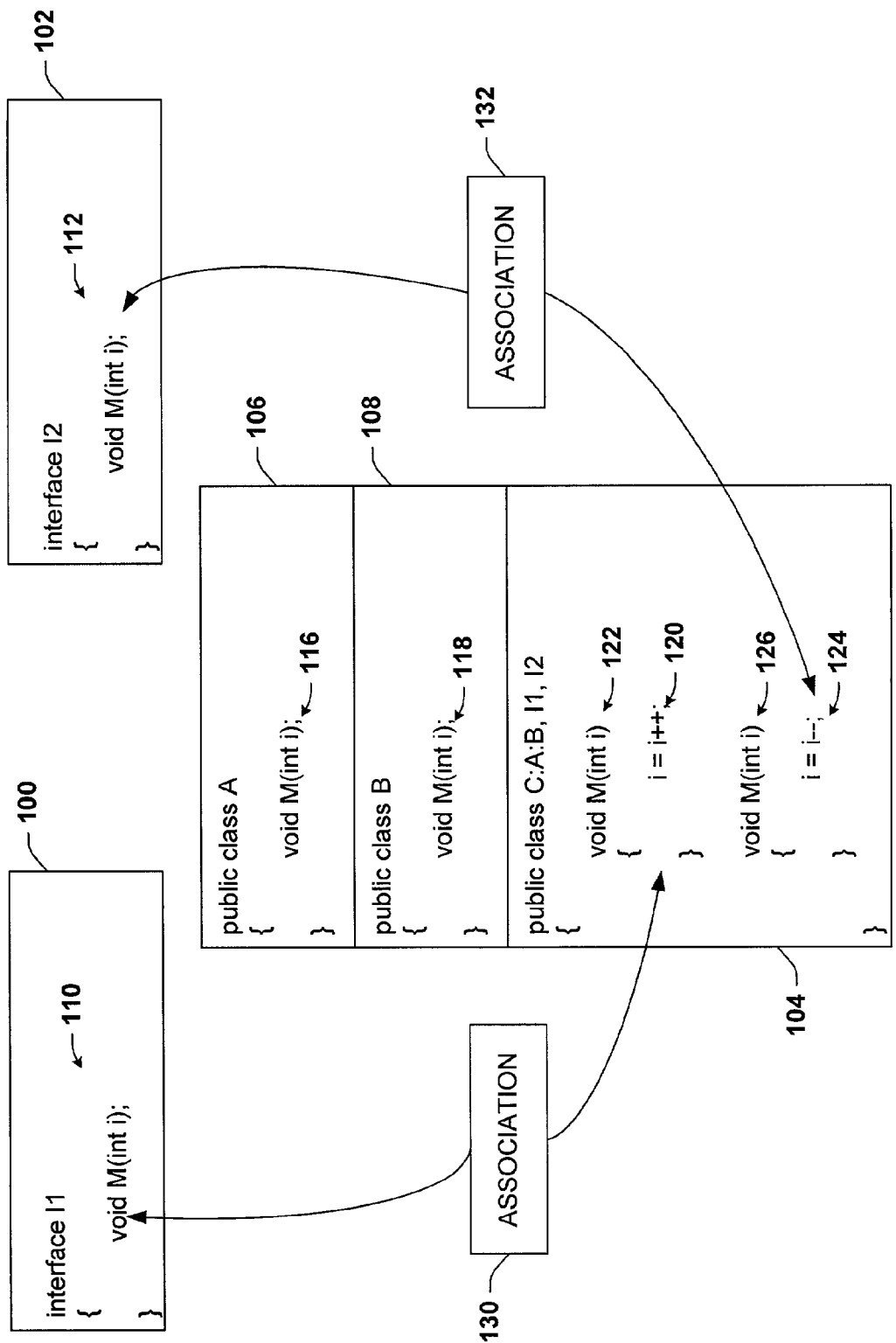
FIG. 4 is a schematic diagram illustrating exemplary declarations and implementations, as well as associations therebetween, according to the invention.
Figure 5:
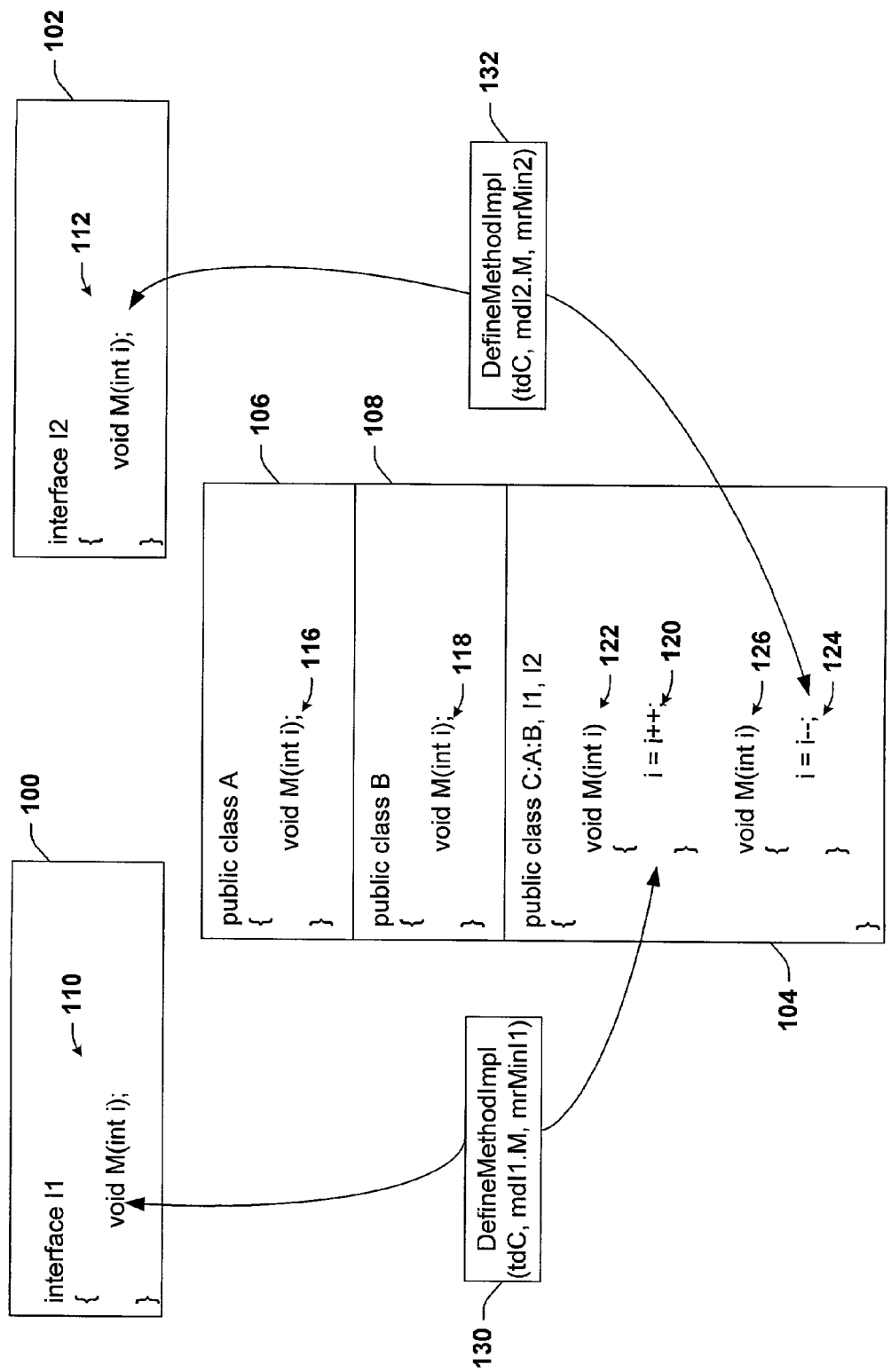
FIG. 5 is a schematic diagram further illustrating the exemplary declarations, implementations, and associations of FIG. 4.

FIGS. 4 and 5 further illustrate various aspects of the invention, wherein software interfaces 100 and 102 are implemented by a class C 104, and wherein the class 104 inherits from classes A 106 and B 108. Interface 100 includes a method declaration 110 comprising a signature "void M(int i)", where "void" indicates that no value is returned, "M" is the method name, and "i" is an integer parameter. In this example, the interface 102 includes an identical method declaration 112 "void M(int i)". The source code for classes 106 and 108 may have been generated by different programmers, wherein the classes 106 and 108 include methods 116 and 118, respectively, having the same signatures "void M(int i)". The inheriting class 104, in turn, provides implementations 120 and 124 having signatures 122 and 126, respectively, for "void M(int i)". The virtual function implementations 120 (e.g., i++) and 124 (e.g., i--), may be selectively associated with the declarations 110 and/or 112 in an unambiguous language neutral fashion in accordance with the invention. For example, a source compiler (not shown) may express an association 130 between the declaration 110 of interface 100 and the implementation 120 of class 104, and another association 132 between the declaration 112 of class 102 and the implementation 124.

Referring also to FIG. 5, the expressed associations 130 and 132 may comprise override associations providing an explicit association between a declaration and an implementation. For example, the override association 130 may comprise an association between a class, a code body associated with the implementation, and the declaration. The exemplary override association 130 may include a tdC field identifying the implementing class C 104, an mdI1.M field identifying the interface declaration 110 in interface I1 100, as well as an mrMinI1 field specifying the implementation code body 120. The association 130 may be expressed as an entry in an override association table having entries for the class, the code body, and the declaration. Similarly, the association 132 may include a tdC field specifying the implementing class C 104, an mdI2.M field identifying the interface declaration 112 in interface I2 102, as well as an mrMinI2 field specifying the implementation code body 124.

Another aspect of the invention provides for expression of an override association regardless of similarities or differences between source language association or disambiguation rules and association rules for a target runtime system or environment. This aspect of the invention includes methodologies and systems for expressing an association between a declaration and an implementation in a language neutral fashion, comprising expressing an association between a source language declaration and an implementation according to an override association rule for a target runtime.

Figure 6:
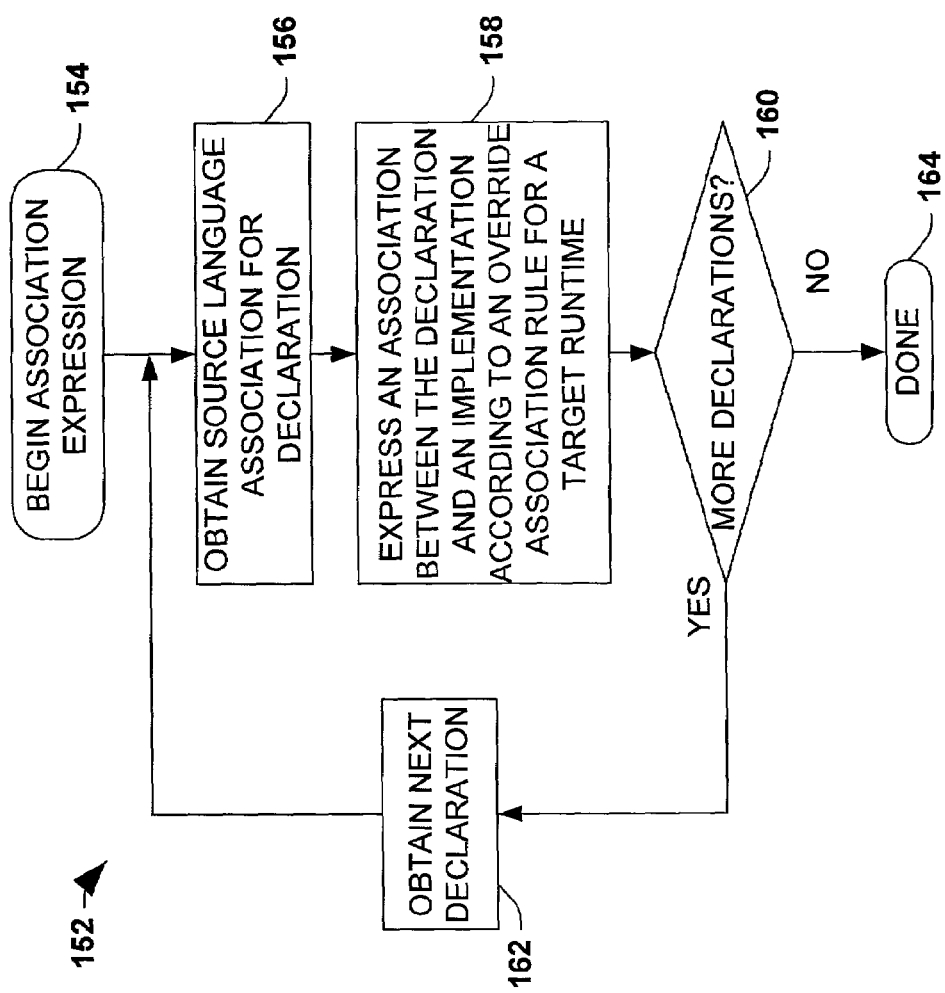
FIG. 6 is a flow diagram illustrating another exemplary method of expressing an association between a declaration and an implementation according to another aspect of the invention.

An exemplary method 152 is illustrated in FIG. 6, beginning at 154. The method 152 may be employed in association with common language runtime systems and other systems illustrated and described in greater detail herein. However, it will be appreciated that the exemplary method 152, as well as other methodologies according to the invention, may be implemented in association with the apparatus and systems illustrated and described herein as well as in association with other systems not illustrated. A source language association is obtained at 156 for a source declaration, and an association is expressed at 158 between a declaration and an implementation according to an override association rule for a target runtime. Thereafter, a determination is made at 160 as to whether other declarations need to be associated with implementations. If so, the next such declaration is obtained at 162, and the method 152 repeats 156, 158, and 160. If not, the method ends at 164.

Figure 7:
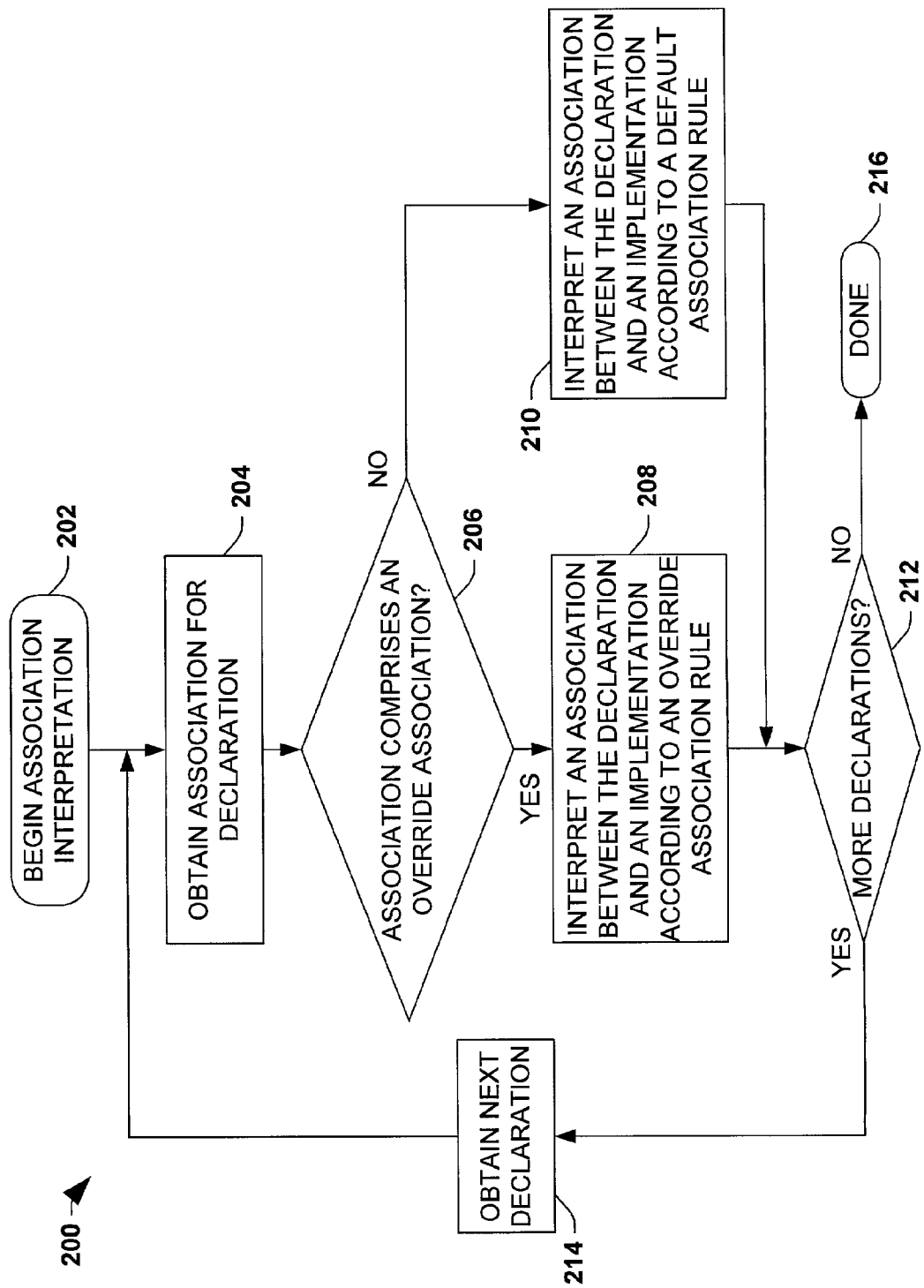
FIG. 7 is a flow diagram illustrating an exemplary method of interpreting an association between a declaration and an implementation according to another aspect of the invention.

Referring now to FIG. 7, another aspect of the invention provides methods and systems for interpreting an association between a declaration and an implementation in a target runtime system. The interpretation of an expressed association may comprise employing the association in executing the program and/or in creating a native code representation of a program for execution at runtime. This aspect of the invention may be employed, for example, in a common language runtime system as described in greater detail hereinafter. An exemplary method 200 for interpreting an association begins at 202, whereafter an association for a declaration is obtained at 204. A determination is made at 206 as to whether the association comprises an override association. For example, the association may be an override association expressed by a source compiler as illustrated and described above, which may comprise an explicit association between a declaration and an implementation.

If so, the association is interpreted at 208 according to an override association rule. For example, the override association rule may comprise making an explicit association between the declaration and the implementation, as indicated by an expressed override association. If not, the association is interpreted at 210 according to a default association rule for the runtime system, such as employing signature matching, name matching, or other rules of association. If more declarations remain at 212, the next such declaration is obtained at 214 and the method 200 continues at 204 as described above. Otherwise, the method 200 ends at 216.

The method 200 may be employed, for example, in association with a common language runtime system receiving IL code and metadata from a source compiler. The implementation may be related to a class, wherein the determination at 206 as to the association comprises an override association may be accomplished by determining whether the metadata comprises an explicit association between the declaration and the implementation. For example, the metadata may include an association between the class, a code body associated with the implementation, and the declaration, which may be an entry in an override association table in the metadata having entries for the class, the code body, and the declaration. The runtime system may then associate the declaration with an implementation by associating the code body with the declaration in the runtime system according to the override association table. This runtime association may then be provided to a JIT compiler in the runtime system via a layout component (not shown).

Figure 8:
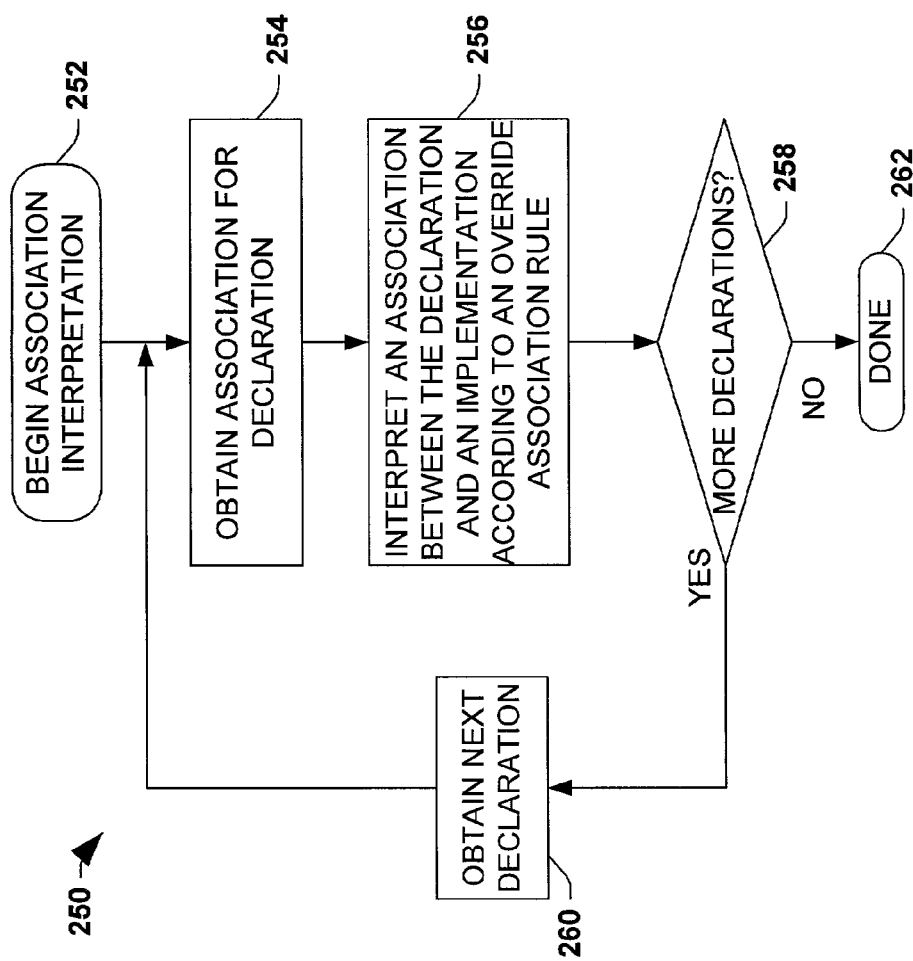
FIG. 8 is a flow diagram illustrating another exemplary method of interpreting an association between a declaration and an implementation according to another aspect of the invention.

Another aspect of the invention provides for interpreting an association according to an override association rule in all cases. For instance, an explicit association (e.g., in a metadata table) may be expressed for each declaration provided to a runtime system. As illustrated in FIG. 8, an exemplary method 250 of interpreting an association between a declaration and an implementation in a target runtime system begins at 252. An association for a declaration is obtained at 254 and interpreted at 256 according to an override association rule. Thereafter, if other declarations remain at 258, the next declaration is obtained at 260, until all such declaration associations have been interpreted at 258, whereafter the method 250 ends at 262. The interpretation at 256 according to an override association rule may comprise associating a code body associated with the implementation with the declaration in the runtime system. The association may then be provided to a JIT compiler via a layout component (not shown).

Figure 9:
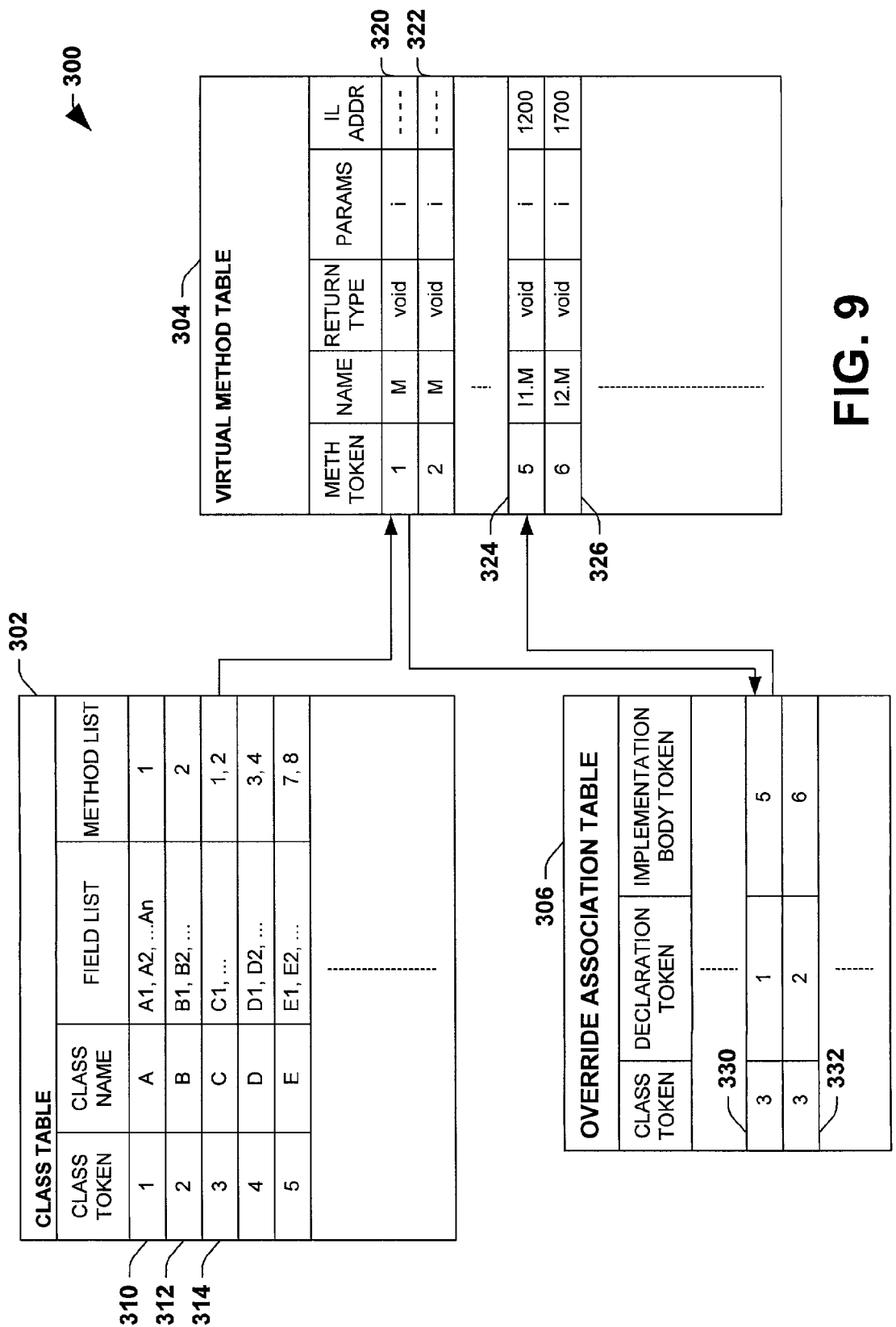
FIG. 9 is a schematic diagram illustrating an exemplary expression of an association between a declaration and an implementation, as well as an interpretation thereof in accordance with the invention.

As further illustration of the invention, FIG. 9 illustrates an example of the association expression and interpretation aspects of the invention. The association between a declaration and an implementation may be expressed in an explicit, language neutral fashion via a system in a source compiler (not shown) as described above. The source compiler may emit an IL code representation of a source language program as well as a metadata component 300, a portion of which is illustrated in FIG. 9. The metadata 300 may include various information which may be organized into one or more tables, such as a class table 302, a virtual method table 304, and an override association table 306.

The exemplary class table 302 comprises one or more entries 310, 312, and 314 representing classes provided in the source code program from which the IL code and metadata 300 were derived. The entries 310, 312, and 314 may include fields for a class token, a class name, a field list, and a method list. The virtual method table 304 includes one or more entries 320, 322, 324, and 326 corresponding to virtual methods in the program. The exemplary override association table 306 includes entries 330 and 332 corresponding to override associations expressed by the source compiler. A runtime system may employ the override association table 306 in determining whether to associate a declaration with an implementation according to one or more default association rules, or to make an association according to an override association rule.

Referring now to FIGS. 4, 5, and 9, the entry 330 in the override association table 306 may be used to express the association 130, whereby a runtime system may interpret the association of the declaration 110 for a method named "M" in the interface I1 100 with the appropriate implementation code body 120 for the virtual method M 122 of the inheriting class C 104. The override association table 306 and the entry 330 thus provide a language neutral explicit association in a situation in which a runtime system employing only name or signature matching may have difficulty in establishing the proper or desired association at runtime. Referring also to FIG. 9, the entry 332 in the override association table 306 may be used to express the association 132, whereby the runtime system may interpret the association of the declaration 112 in the interface I2 102 for a method named "M" with the appropriate implementation code body 124 for the virtual method M 126 of the inheriting class C 104.

Figure 10:
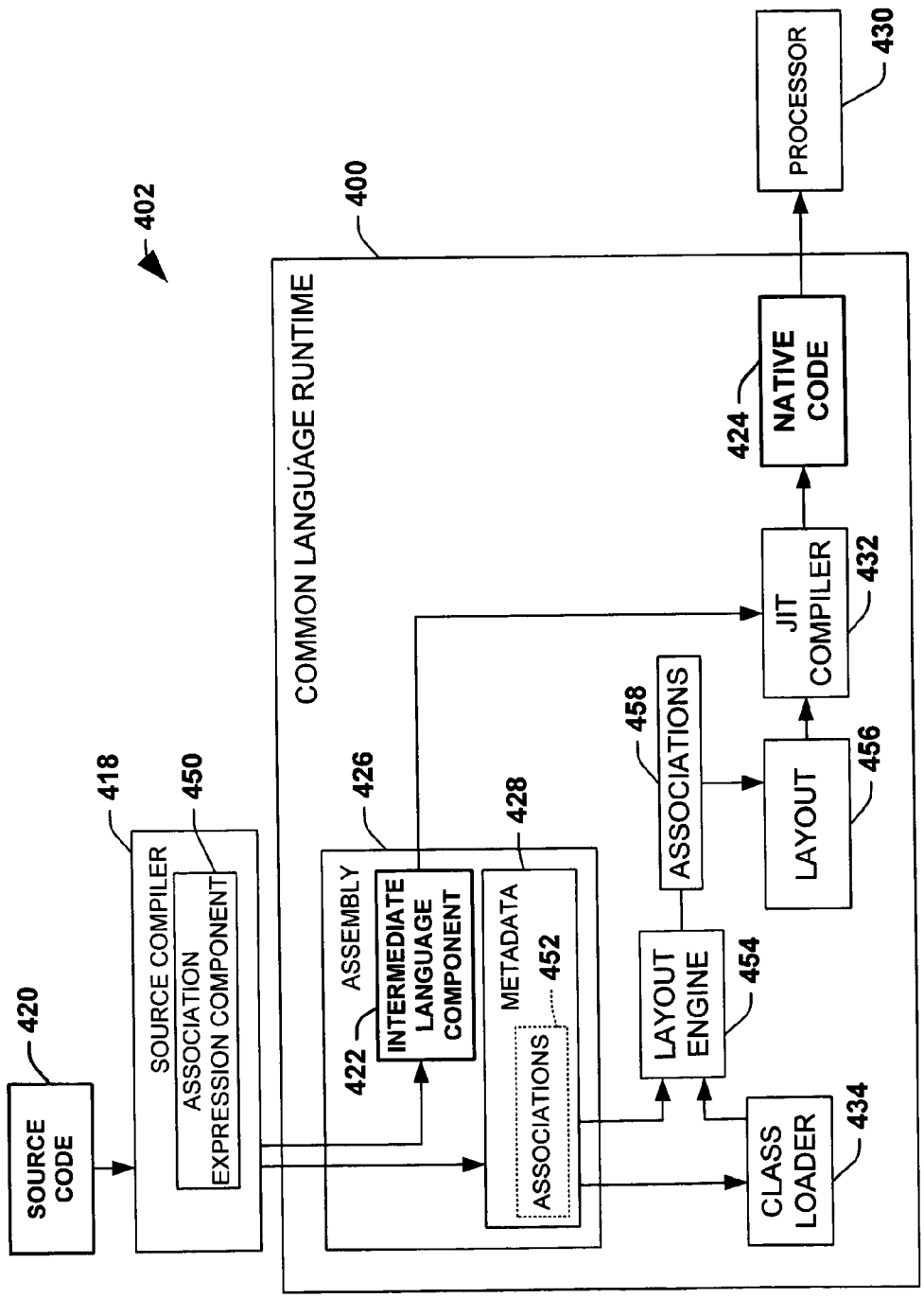
FIG. 10 is a schematic diagram illustrating an exemplary source compiler and an exemplary runtime system in accordance with another aspect of the invention.

An exemplary runtime system 400 is illustrated in FIG. 10 for running a software program. The program may comprise a source code component 420 created or written in a source code language (e.g., VISUAL BASIC, C++, C#, java script, APL, COBOL, Pascal, Eiffel, Haskell, ML, Oberon, Perl, Python, Scheme, Smalltalk, Objective Camel, and the like), an intermediate language (IL) component 422 (e.g., MSIL or the like), and a native code component 424, wherein the native code component 424 comprises instructions which may be executed or directly operated on by a processor 430 in a computer system 402.

The exemplary runtime system 400 further comprises an intermediate language compiler such as a just-in-time (JIT) compiler 432, which is operable to compile intermediate language code (e.g., IL component 422) into native code (e.g., native code component 424). The source code component 420 may be compiled via a source compiler 418 having an association expression component 450, whereby an intermediate language representation of the program is created, such as an assembly 426. The exemplary assembly 426 comprises the intermediate language (IL) code component 422 and a metadata component 428, which may include one or more associations 452 (e.g., between declarations and implementations) emitted by the source compiler 418 via the association expression component 450 in accordance with the invention.

The IL component 422 comprises intermediate language instructions representative of functions, methods, variables, etc. associated with the software program, and the metadata 428 may include descriptions of types, classes, references to external assemblies, record version information such as author, and the like, which may be provided in the form of one or more tables (e.g., FIG. 9). The assembly 426 may be presented to the runtime system 400 by the source compiler 418 as a unit of deployment for execution therein in the form of a file, such as a .exe or a .dll file, which comprises the IL component 422 and the metadata component 428. The runtime system 400 may load the assembly 426 or portions thereof into memory for JIT compilation and execution via a class loader component 434, which may load classes or types within the assembly 426 on a class-by-class basis using a layout engine 454, wherein the associated IL code for a class (e.g., from the IL component 422) and the associated metadata for the class or type (e.g., from the metadata component 428) are loaded into memory as the class or type is needed.

A layout 456 for the program, or portions thereof, may be provided to the JIT compiler 432 via the layout engine 454 and the class loader 434, wherein the associations 452 in the metadata component 428 (e.g., including override associations) are interpreted so as to provide runtime associations 458 for execution of the program. When further classes or types are encountered in the execution of the program, the class loader 434 is again used to load the new class or type, if the desired class or type is in the assembly 426. Where an external class or type is referenced (e.g., not within the assembly 426), an assembly resolver (not shown) locates the desired type, and provides it to the class loader 434.

In accordance with the invention, the runtime system 400 may implement one or more default association rules for associating declarations with implementations, and may selectively employ override association rules, for instance, where the default rules would cause ambiguity in resolving the proper association to be implemented. For example, the class loader 434 may search the metadata component 428 of an assembly 426 for override associations (e.g., such as entries in the override association table 306), whereby the layout engine 454 use the override associations from the metadata to create the associations 458 in constructing the layout 456. The system 400 may therefore provide for the proper association between declarations and implementations at runtime, selectively employing override association rules as needed (e.g., or always), so as to avoid ambiguity or vagueness caused by source language association rules about which the runtime system 400 knows nothing.

The invention thus provides for source compilers 418 providing default associations expressions (e.g., using signature matching) where the default association will be understood by the runtime system 400, and selectively (e.g., or always) providing override association expressions where the runtime association rules do not overlap with the source language association rules. The runtime system 400, in turn, is adapted to employ override association rules as needed (e.g., or always) to implement explicit associations provided by the source compiler 418, and to employ default runtime associations rules (e.g., signature matching) where no override association is encountered.

Once a class or type has been loaded by the class loader, the class may be provided to a verifier (not shown) to verify whether the IL code (e.g., IL component 422) is typesafe in order to protect the code from unauthorized access. The verifier may accordingly check to see that the metadata 428 is well-formed, and may perform control flow analysis to determine whether structural and behavioral conditions are met. The JIT compiler 432 then compiles or converts the IL code (e.g., from IL component 422) into corresponding native code (e.g., native code component 424) on a method-by-method basis.

The class loader 434 may load the IL code associated with the methods of a particular class, and the first time a particular method is to be executed, the JIT compiler 432 compiles the IL code (e.g., from the IL component 422) for the method into native code (e.g., in the native code component 424). The compiled code may be stored in memory in the location from which the associated IL code was obtained by the JIT compiler 432. Thus, the IL component 422 and native code component 424 may be interleaved in memory at a given point in the execution of the program. In one mode of operation, the compiled native code is not persisted to disk, but instead resides in runtime system memory. However, the system 400 may operate in other modes in which an install time compilation of native code is performed, wherein the resulting native code may be persisted to disk along with the associated IL code for a particular software program.

Figure 11:
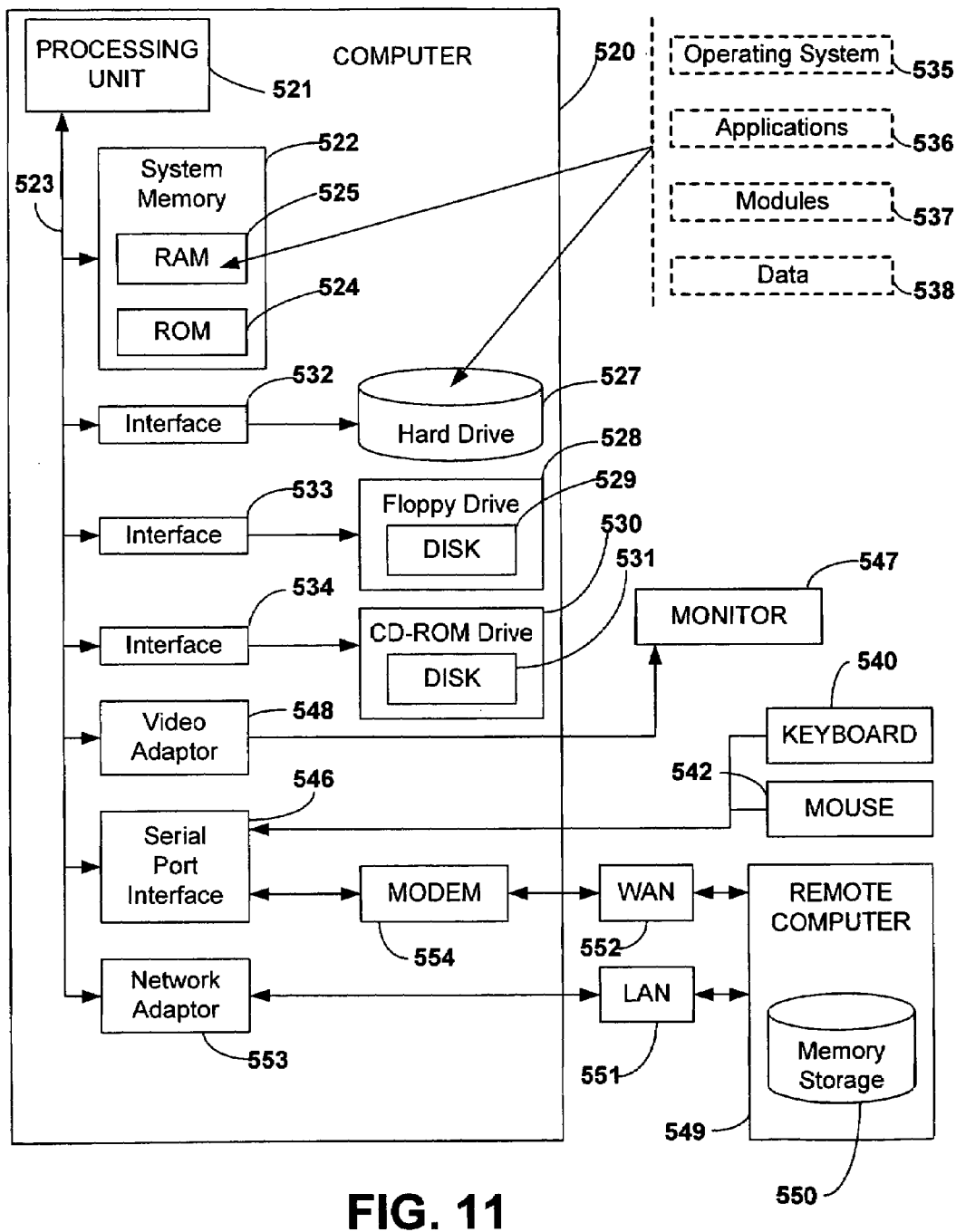
FIG. 11 is a schematic diagram illustrating an exemplary operating environment in which one or more aspects of the invention may be implemented.

In order to provide a context for the various aspects of the invention, FIG. 11 and the following discussion are intended to provide a brief, general description of a suitable computing environment in which the various aspects of the present invention may be implemented. While the invention has been described above in the general context of software tools and computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 11, an exemplary environment for implementing various aspects of the invention includes a conventional personal or server computer 520, including a processing unit 521, a system memory 522, and a system bus 523 that couples various system components including the system memory to the processing unit 521. The processing unit 521 may be any of various commercially available processors. Dual microprocessors and other multi-processor architectures also can be used as the processing unit 521. The system bus 523 may be any of several types of bus structure including a memory bus or memory controller, a peripheral bus, and a local bus using any of a variety of conventional bus architectures. The computer memory may include read only memory (ROM) 524 and random access memory (RAM) 525. A basic input/output system (BIOS), containing the basic routines that help to transfer information between elements within the computer 520, such as during start-up, is stored in ROM 524.

The computer 520 further includes a hard disk drive 527, a magnetic disk drive 528, e.g., to read from or write to a removable disk 529, and an optical disk drive 530, e.g., for reading a CD-ROM disk 531 or to read from or write to other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide nonvolatile storage of data, data structures, computer-executable instructions, etc. for the computer 520, including for the storage of broadcast programming in a suitable digital format.

Although the description of computer-readable media above refers to a hard disk, a removable magnetic disk and a CD-ROM, it will be appreciated by those skilled in the art that other types of media which are readable by a computer, such as zip drives, magnetic cassettes, flash memory cards, digital video disks, Bernoulli cartridges, and the like, may also be used in the exemplary operating environment, and further that any such media may contain computer-executable instructions for performing the methods of the present invention. A number of program modules may be stored in the drives and RAM 525, including an operating system 535, one or more application programs 536, other program modules 537, and program data 538.

A user may enter commands and information into the computer 520 through a keyboard 540 and a pointing device, such as a mouse 542. Other input devices (not shown) may include a microphone, an IR remote control, a joystick, a game pad, a satellite dish, a scanner, or the like. These and other input devices are often connected to the processing unit 521 through a serial port interface 546 that is coupled to the system bus 523, but may be connected by other interfaces, such as a parallel port, a game port, a universal serial bus ("USB"), an IR interface, etc. A monitor 547 or other type of display device is also connected to the system bus 523 via an interface, such as a video adapter 548. In addition to the monitor, a computer typically includes other peripheral output devices (not shown), such as speakers, printers etc.

The computer 520 may operate in a networked environment using logical connections to one or more remote computers, such as a remote computer(s) 549. The remote computer(s) 549 may be a workstation, a server computer, a router, a personal computer, microprocessor based entertainment appliance (e.g., a WebTV client system), a peer device or other common network node, and typically includes many or all of the elements described relative to the computer 520, although, for purposes of brevity, only a memory storage device 550 is illustrated. The logical connections depicted include a local area network (LAN) 551 and a wide area network (WAN) 552. Such networking environments are commonplace in offices, enterprise-wide computer networks, intranets and the Internet.

When used in a LAN networking environment, the computer 520 is connected to the local network 551 through a network interface or adapter 553. When used in a WAN networking environment, the computer 520 typically includes a modem 554, or is connected to a communications server on the LAN, or has other means for establishing communications over the WAN 552, such as the Internet. The modem 554, which may be internal or external, is connected to the system bus 523 via the serial port interface 546. In a networked environment, program modules depicted relative to the computer 520, or portions thereof, may be stored in the remote memory storage device 550. It will be appreciated that the network connections shown are exemplary and other means of establishing a communications link between the computers may be used.

Although the invention has been shown and described with respect to certain implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary applications and implementations of the invention. As used in this application, the term "component" may refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, both an application running on a server and the server can be a component.

In addition, while a particular feature of the invention may have been disclosed with respect to only one of several aspects or implementations of the invention, such a feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims.

What is claimed is:

1. Computer executable instructions for performing a method of compiling an intermediate language representation of a source language computer program and providing the intermediate language representation to a target runtime, the computer executable instructions stored on computer readable media, the method comprising:
    determining whether a source language association rule related to a declaration is different from a default association rule for a target runtime;
    compiling an association between the declaration and an implementation into its intermediate language representation according to an override association rule for the target runtime if the source language association rule is different from the default association rule for the target runtime;
    compiling an association between the declaration and the implementation into its intermediate language representation according to the default association rule if the source language association rule is the same as the default association rule for the target runtime; and
    providing the intermediate language representation of the association between the declaration and the implementation to the target runtime to compile the intermediate language representation into native code.

2. The method of claim 1, wherein compiling the association according to the override association rule comprises expressing an explicit association between the declaration and the implementation.

3. The method of claim 2, wherein expressing the explicit association comprises creating an association between a class, a code body associated with the implementation, and the declaration.

4. The method of claim 3, wherein creating the association between the class, the code body associated with the implementation, and the declaration comprises creating an entry in an override association table having entries for the class, the code body, and the declaration.

5. The method of claim 1, wherein the declaration comprises a method declaration signature, the implementation comprises an implementation signature, the default association rule for the target runtime comprises signature matching, and wherein compiling the association between the declaration and the implementation according to the override association rule for the target runtime if the source language association rule is different from the default association rule for the target runtime comprises expressing the association between the method declaration signature and the implementation signature if the source language association rule is different from signature matching.

6. The method of claim 5, wherein compiling the association comprises creating the association between a class, a code body associated with the implementation signature, and the method declaration signature.

7. The method of claim 6, wherein creating the association between the class, the code body associated with the implementation signature, and the method declaration signature comprises creating an entry in an override association table having entries for the class, the code body associated with the implementation signature, and the method declaration signature.

8. The method of claim 5, wherein the method declaration signature matches a first implementation signature associated with a first implementation in the class and a second implementation signature associated with a second implementation in the class, and wherein expressing the association between the method declaration signature and the implementation signature according comprises expressing an explicit association between the method declaration signature and one of the first and second implementation signatures.

9. The method of claim 8, wherein expressing the explicit association comprises creating the association between the class, a code body associated with one of the first and second implementations, and the method declaration signature.

10. The method of claim 9, wherein creating the association between the class, the code body associated with one of the first and second implementations, and the method declaration signature comprises creating an entry in an override association table having entries for the class, the code body associated with one of the first and second implementations, and the method declaration signature.

11. The method of claim 8, further comprising selecting one of the first and second implementations for association with the method declaration signature according to the source language association rule.

12. A computer-readable medium having computer-executable instructions for:
    determining whether a source language association rule related to a declaration is different from a default association rule for a target runtime;
    compiling an association between the declaration and an implementation into intermediate language code according to an override association rule for the target runtime if the source language association rule is different from the default association rule for the target runtime;
    compiling an association between the declaration and the implementation into intermediate language code according to the default association rule if the source language association rule is the same as the default association rule for the target runtime; and providing the intermediate language code of the association between the declaration and the implementation to the target runtime to compile the intermediate language code into native code.

13. The computer-readable medium of claim 12, wherein the computer-executable instructions for compiling the association according to the override association rule comprises computer-executable instructions for expressing an explicit association between the declaration and the implementation.

14. The computer-readable medium of claim 13, wherein the computer-executable instructions for expressing the explicit association comprises computer-executable instructions for creating the association between a class, a code body associated with the implementation, and the declaration.

15. The computer-readable medium of claim 14, wherein the computer-executable instructions for creating the association between the class, the code body associated with the implementation, and the declaration comprises computer-executable instructions for creating an entry in an override association table having entries for the class, the code body, and the declaration.

16. The computer-readable medium of claim 12, wherein the declaration comprises a method declaration signature, the implementation comprises an implementation signature, the default association rule for the target runtime comprises signature matching, and wherein expressing an association between the declaration and the implementation according to the override association rule for the target runtime if the source language association rule is different from the default association rule for the target runtime comprises expressing the association between the method declaration signature and the implementation signature if the source language association rule is different from signature matching.

17. The computer-readable medium of claim 16, wherein the method declaration signature matches a first implementation signature associated with a first implementation in a class and a second implementation signature associated with a second implementation in the class, and wherein the computer-executable instructions for expressing the association between the method declaration signature and the implementation signature if the source language association rule is different from signature matching comprises computer-executable instructions for expressing an explicit association between the method declaration signature and one of the first and second implementation signatures.

18. A computer-implemented system for compiling an association between a declaration and an implementation, the computer-implemented system stored on computer-readable media, the computer-implemented system comprising:

a first component to determine whether a source language association rule related to the declaration is different from a default association rule for a target runtime; and an association expression component to compile the association between the declaration and the implementation into its intermediate language representation according to an override association rule for the target runtime if the source language association rule is different from the default association rule for the target runtime, to compile the association between the declaration and the implementation into its intermediate language representation according to the default association rule if the source language association rule is the same as the default association rule for the target runtime, and to provide the intermediate language representation of the association between the declaration and the implementation to the target runtime to compile into machine executable code.

19. The computer-implemented system of claim 18, wherein the association expression component expresses an explicit association by creating the association between a class, a code body associated with the implementation, and the declaration.

20. The computer-implemented system of claim 19, wherein the association expression component creates an entry in an override association table having entries for the class, the code body, and the declaration.

21. A source compiler embodied on a computer-readable medium for generating an intermediate language representation of a source code program, comprising:

an association expression system for expressing an association between a source language declaration and an implementation in a language neutral fashion, the association expression system comprising:

a first component to determine whether a source language association rule related to the source language declaration is different from a default association rule for a target runtime; and an association expression component to compile the association between the source language declaration and the implementation into intermediate language code according to an override association rule for the target runtime if the source language association rule is different from the default association rule for the target runtime, the association expression component further to compile the association between the declaration and the implementation into intermediate language code according to the default association rule if the source language association rule is the same as the default association rule for the target runtime, and to provide the intermediate language code of the association between the declaration and the implementation to the target runtime to compile into machine executable code.

* * * * *